United States Patent [19]
Scheinman et al.

[11] Patent Number: 4,819,978
[45] Date of Patent: Apr. 11, 1989

[54] GRASP FORCE SENSOR FOR ROBOTIC HANDS

[75] Inventors: Victor D. Scheinman, Woodside; Antal K. Bejczy, Pasadena; Howard C. Primus, La Crescenta, all of Calif.

[73] Assignee: California Institute of Technology, Pasadena, Calif.

[21] Appl. No.: 879,802

[22] Filed: Jun. 27, 1986

[51] Int. Cl.⁴ .................... B25J 15/08; B25J 19/02
[52] U.S. Cl. .................. 294/119.1; 294/902; 294/907; 901/33; 901/39; 901/46
[58] Field of Search ............. 294/86.4, 88, 99.1, 294/103.1, 119.1, 902, 907; 73/862.04, 862.65; 901/30–39, 45, 46

[56] References Cited

U.S. PATENT DOCUMENTS

| | | | |
|---|---|---|---|
| 3,948,093 | 4/1976 | Folchi et al. | 901/46 X |
| 4,132,318 | 1/1979 | Wang et al. | 294/907 X |
| 4,447,048 | 5/1984 | Fischer | 901/45 X |
| 4,456,293 | 6/1984 | Panissidi | 294/907 X |
| 4,478,089 | 10/1984 | Aviles et al. | 901/46 X |
| 4,616,511 | 10/1986 | Gindy et al. | 901/46 X |

FOREIGN PATENT DOCUMENTS 3038234  5/1982  Fed. Rep. of Germany ...... 294/902

OTHER PUBLICATIONS

IBM Technical Disclosure Bulletin, vol. 24, No. 10, Mar. 1982, "Combined Compliance Structure and Air Gauge Sensor", by Brennemann.

Primary Examiner—Johnny D. Cherry
Attorney, Agent, or Firm—Jackson & Jones

[57] ABSTRACT

A grasp force sensor for robotic hands is disclosed. A flexible block is located in the base of each claw through which the grasp force is exerted. The block yields minute parallelogram deflection when the claws are subjected to grasping forces. A parallelogram deflection closely resembles pure translational deflection, whereby the claws remain in substantial alignment with each other during grasping. Strain gauge transducers supply signals which provide precise knowledge of and control over grasp forces.

11 Claims, 2 Drawing Sheets

4,819,978

GRASP FORCE SENSOR FOR ROBOTIC HANDS

ORIGIN OF THE INVENTION

The invention described herein was made in the performance of work under a NASA contract, and is subject to the provisions of Public Law 96-517 (35 USC 202) in which the Contractor has elected to retain title.

FIELD OF THE INVENTION

This invention relates to robotic hands or end effectors. More particularly the invention relates to a robotic hand in combination with means for sensing the grasp force of the hand.

BACKGROUND OF THE INVENTION

The human hand is both a sensory organ through which information is transmitted and received, and a powerful and delicate tool. The field of robotics seeks to design a robotic hand which is equally and dextrous and sensitive as the human hand. Imparting power to a robotic hand is easily accomplished and is well known. Since a robotic hand acts as an amplification of a human hand force, it is capable of grasping capabilities over a wider range than the human hand. With such capability goes the need for: (1) a wide range of grasp force sensitivity, in order to prevent damage to the hand and/or grasped objects, (2) revealing when the object is first grasped; and (3) precise operation in performing delicate tasks.

Past approaches to measuring robotic hand grasp force have focused on the use of cantilevered claws whose rotary deflection was measured. Another prior art approach was to employ mounts whose bending was monitored. Although the rotary or bending motions of these approaches was slight, such motions caused a departure from parallelism of the claws during grasping. Such prior art grasp force sensing and mounting systems, prior to the advent of this invention, were inadequate.

SUMMARY OF THE INVENTION

A grasp force sensor for robotic hands comprises a flexible block in the base of each claw (finger) through which the grasp force is exerted. The block yields minute parallelogram deflection when the claws are subjected to grasping forces. A parallelogram deflection closely resembles pure translational deflection, and thus the claws remain in substantial alignment with each other during grasping. Strain gauge transducers are mounted on the surface of the base to supply signals which provide precise knowledge of and control over grasp forces. Grasp force is sensed directly through the strain gauges on the base block. Claw misalignment is significantly reduced in the system of this invention.

DETAILED DESCRIPTION OF THE DRAWING

Figure 1:
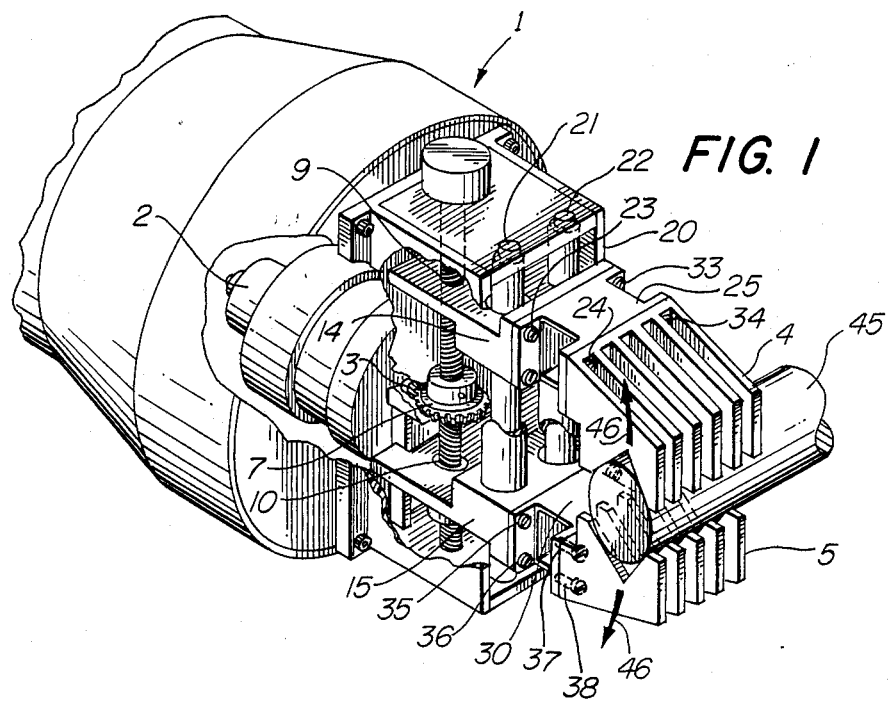
FIG. 1 is a perspective view of a robotic hand assembly.

FIG. 1 depicts a robotic hand assembly 1 including a pair of identical and opposing fingers (claws) 4 and 5. Claws 4 and 5 are adapted to move closer to or further apart from each other in response to any well known gear motor combination. As shown in FIG. 1, motor 2 rotates a beveled drive gear 3. A mating drive gear 7 is mounted on and secured to a threaded shaft 8. Shaft 8, upon rotation, moves claws 4 and 5 either closer together or further apart depending upon the direction of rotation.

Shaft 8 turns within inner threaded openings 9 and 10 in a pair of guide pieces 14 and 15. Guide pieces 14 and 15 slide in a channel frame 20, which frame holds a pair of double slide rods 21, 22. Jaws 4 and 5 are thus adapted to move together or apart in a smooth non-binding motion under control of any suitable computer or control system (not shown) which energizes motor 2.

On the flat outer faces of guides 14 and 15 are mounted a pair of flexible base members 25 and 30. Each base member is I shaped and has a central elongated hollow rectangular cylinder with extending mounting ears integrally formed therewith. Threaded bolts, such as 23, 24 and 33, 34 hold the upper and lower edges of the outwardly extending ears of base block 25 respectively to guide 14 and claw 4. Comparable bolts 35, 36 and 37, 38 secure claw 5 to guide 15.

It is imperative that claws 4 and 5 move parallel to one another. Such movement was not adequately provided by a cantilever mounting of claws such as 4 and 5. We have discovered that the use of the hollow rectangular base members 25 and 30 positioned between the claws 4 and 5 and guides 14 and 15 respectively, not only improves the claw movement but additionally provides mounting surfaces for sensing the forces applied to claws 4 and 5. Assume that claws 4 and 5 have applied a holding force of say forty-five pounds to a solid cylinder 45. This invention allows that force to be applied essentially free of any misalignment between claws 4 and 5 and also provides a strain gauge sensing and measuring circuit which monitors the grasp or external forces on claws 4 or 5.

Figure 2:
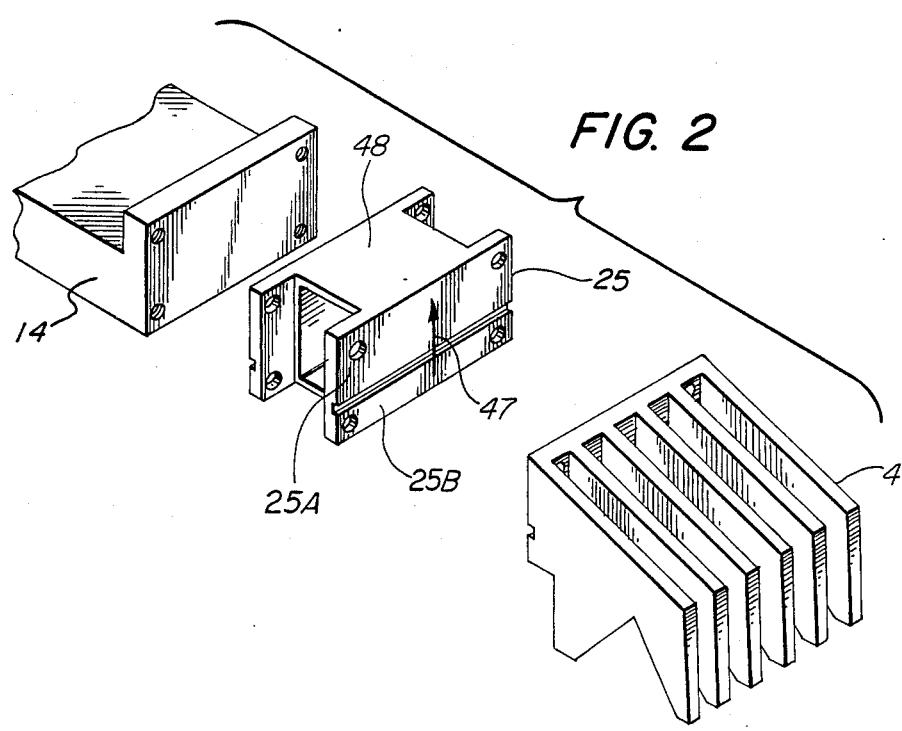
FIG. 2 is a partially cut away perspective view of one flexible block base with one claw exploded away.

FIG. 2 depicts an exploded view of claw 4 and the base member 25. Application of grasping force by claws 4 and 5 to cylinder 45, FIG. 1, tends to spread claws 4 and 5 apart as shown by the arrows 46. A cantilever connection of the prior art would tend to rotate a claw, such as claw 4 for example, counterclockwise relative to a pivot or connection point. Base 25, however, mates the upper and bottom surfaces 25A and 25B flush to corresponding mating surfaces on claw 4. The other side of base 25 is likewise flush with a comparable mating surface on guide 14. Although base 25 may be made of any suitable material such as aluminum, for example, it does tend to distort slightly in response to the jaw's grasping force. The small distortions experienced by base 25 cause it to be termed herein as a "flexible" base member. As shown by arrow 47, FIG. 2, the distortion is upwardly at the outer surfaces 25A and of base 25.

Figure 3:
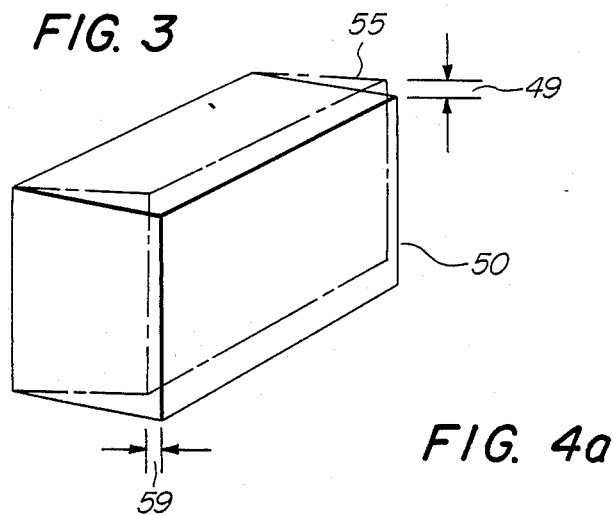
FIG. 3 is a simplified view useful in explaining the parallelogram deflection provided by the mounting system of this invention.

Note that a slight deflection in base 25, when viewed in exaggerated form in FIG. 3, results essentially in a parallelogram motion. The solid lines 50 in FIG. 3 represent the sides of the central portion of base 25 without it experiencing any grasp force. The dotted lines 55 depict the parallelogram motion experienced by base 25 in response to a grasp force between claws 4 and 5. Opposition to forces in the direction of arrow 46, FIG.

2, causes a vertical deflection 49, which deflection moves the entire plane within dashed lines 55 upward slightly. Such motion assures that claws 4 and 5 remain essentially parallel. Note that some small fraction of horizontal motion 59 is also involved, but that small fraction merely moves the claws closer to the base and does not cause misalignment in the parallelism of claws 4 and 5.

Figure 4A:
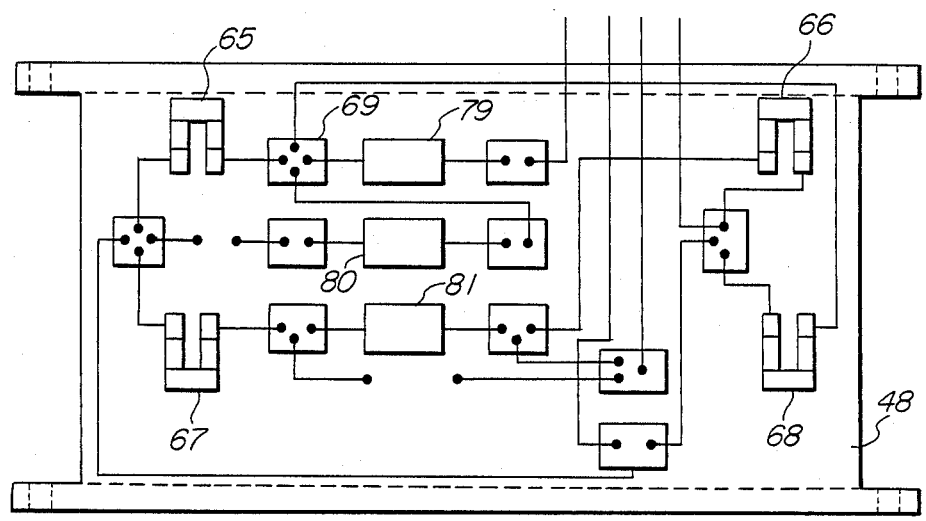
FIG. 4 is a schematic including FIGS. 4A and 4B of a full bridge strain gauge useful in connection with this invention.
Figure 4B:
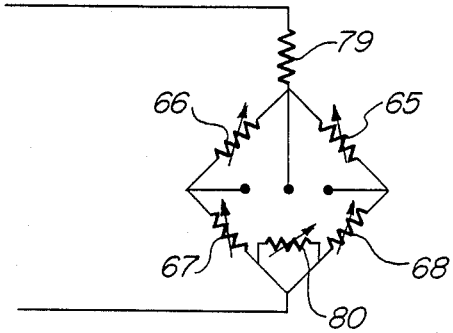

The top or bottom surfaces, either inner or outer, carry strain gauges for obtaining output signals capable of use by any well known computer or control system. Four gauges 65, 66, 67 and 68 are mounted on surface 48 in the manner shown in FIG. 4. The smaller rectangles such as 69 depict solder connection pads for electrical circuit leads as is well known in the strain gauge and robotic art. Resistors 79 and 80 are shown in electrical schematic in FIG. 4B. Such resistors develop an operating potential and balance the bridge circuit. Stress in the gauges of FIG. 4A is reflected as an impedance change as shown in FIG. 4B. Note that strain gauges 65 through 68 are connected in a full bridge, FIG. 4B, such that a compression force is read as a differential voltage of one polarity whereas a tension force is read as a differential voltage of an opposite polarity. The magnitude of the bridge voltages vary in accordance with the magnitude of the grasping force applied by claws 4 and 5. The hollow nature of base 25 also allows the full bridge strain gauges to be mounted on the inner surfaces of either or both, of the upper or lower sides of base 25. Similar full bridge strain gauges are also mounted on the other base 30.

As is known the strain gauges 65 through 68, when placed in a bridge configuration, yield output signals which are indicative of the forces at claws 4 and 5. If either claw were to strike an object, that fact would also be registered in the strain gauge bridge and a rapid stop and alarm could be initiated by any suitable computer or control circuit. Many suitable strain gauge circuits are well known in this art and need no further description in connection with this invention. Suffice it to say that the hollow rectangular mounting base provides surfaces which readily receive a force sensing means in order to provide a direct reading of force or other claw contact in a simple and reliable manner not heretofore known or suggested by the prior art.

The above description presents the best mode contemplated in carrying out our invention. Our invention is, however, susceptible to modifications and alternate constructions from the embodiments shown in the drawings and described above. Consequently, it is not the intention to limit the invention to the particular embodiments disclosed. On the contrary, the invention is intended and shall cover all modifications, sizes and alternate constructions falling within the spirit and scope of the invention, as expressed in the appended claims when read in light of the description and drawings.

What is claimed is:

1. A robotic hand including a pair of opposed claws positioned in parallel and aligned with each other for grasping an object as at least one of said claws is moved toward the other along a common direction of movement, and means for moving at least one of said claws, said hand comprising:
   a slide member, selectively moveable by said claw moving means along said common direction of claw movement, said slide member having a flat outwardly facing surface mounting plane;
   at least one claw member of said pair of claws having an inwardly directed flat surface mounting plane matching said mounting plane of said slide member;
   a hollow rectangular cylinder mounting base with opposed and spaced parallel forward and rearward facing sides each having flat surface mounting planes conforming to said surface mounting planes of said slide member and said one claw member;
   means securably positioning said flat surface mounting planes of said sides of said base against the mounting planes of said slide member and said one claw member to fixably join said base between said slide member and said one claw member; and
   said mounting base, as force is applied to said object by movement of said one claw member along said common direction, being characterized as translationally deformable, essentially as a parallelogram wherein said parallel sides of said base remain essentially parallel and move relative to one another in a direction corresponding to the direction of claw movement, and deflect inwardly toward each other in a direction transverse to said direction, whereby said claws remain aligned and parallel with each other as force is applied to said object.

2. A robotic hand in accordance with claim 1 wherein said base includes at least one other surface in addition to said sides that have said mounting surface planes, and said hand further comprising:
   deformation sensing means mounted on said additional surface of said base for sensing a force applied to an object by said claws.

3. A robotic hand in accordance with claim 2 wherein said base further comprises:
   a metal hollow rectangular cylinder having said deformation sensing means mounted on said additional surface thereof.

4. A robotic hand in accordance with claim 3 wherein said sensing means further comprises:
   strain gauge transducers connected in a bridge circuit on said additional surface.

5. A robotic hand in accordance with claim 1 wherein said hollow rectangular cylinder base is further characterized as being made of:
   an essentially rigid aluminum material.

6. A robotic hand including claws for grasping an object, and means for activating said claws along a direction of movement towards each other, said hand comprising:
   a pair of slide members each selectively moveable by said activating means and each having an outwardly facing surface mounting plane;
   a pair of claw members each having an inwardly directed surface mounting plane matching the outwardly facing surface mounting plane of each one of said pair of slide members;
   a pair of hollow rectangular cylinder mounting bases with each base of said pair of bases having at least a pair of opposed, parallel and spaced mounting surface planes with one each of said pair conforming to said surface of one each of said slide member and said claw member pair, respectively, and each base deformable along the direction of claw movement;
   means securely affixing together the surface planes of one each of said pair of bases between one each of said pair of slide members and said pair of claw members respectively;

each of said mounting bases, as force is applied to said object by movement of said claw pair along said common direction, being characterized as translationally deformable essentially as a parallelogram wherein said pair of plane mounting surfaces of each of said bases remain essentially parallel and move relative to one another in a direction corresponding to that of the claw movement and deflect inwardly toward each other in a direction transverse to said claw movement, whereby said pair of claw members remain aligned and parallel with each other as said pair of claws apply force to said object.

7. A robotic hand in accordance with claim 6 and further comprising:

strain gauge deformation sensing means mounted on at least one of said bases for sensing force on the claw connected to said one base.

8. A robotic hand in accordance with claim 6 wherein each of said bases further comprise:

a hollow rectangular cylinder selected from an essentially rigid metal material.

9. A robotic hand in accordance with claim 6 and further characterized in that:

at least one of said rectangular cylinder bases includes at least one surface in addition to said spaced mounting surface planes; and deformation sensing means mounted on said one additional surface of said one base for sensing force applied by said claws to said object.

10. A robotic hand in accordance with claim 9 wherein said deformation sensing means includes strain gauge means which further comprise:

transducers connected in a bridge circuit, with said bridge circuit also being mounted on said additional surface of said base.

11. A robotic hand in accordance with claim 10 wherein each of said pair of bases further comprise a short and a longer transverse dimension and wherein:

the short dimension of said hollow rectangular cylinder is axially aligned with the direction of movement of said pair of claws; and the longer dimension of said hollow rectangular cylinder is transverse to said direction of claw movement.

* * * * *